US008059300B2

(12) United States Patent
Kimura et al.

(10) Patent No.: US 8,059,300 B2
(45) Date of Patent: Nov. 15, 2011

(54) INFORMATION PROCESSING APPARATUS CONNECTED TO A PRINTING APPARATUS VIA A NETWORK AND COMPUTER-READABLE STORAGE MEDIUM HAVING STORED THEREON A PROGRAM FOR CAUSING A COMPUTER TO EXECUTE GENERATING PRINT DATA IN THE INFORMATION PROCESSING APPARATUS CONNECTED TO THE PRINTING APPARATUS VIA THE NETWORK

(75) Inventors: Yoshio Kimura, Kawasaki (JP); Yushi Matsukubo, Yokohama (JP); Fumio Mikami, Chigasaki (JP); Yoshinobu Umeda, Ohta-ku (JP); Tadashi Kawaguchi, Shinagawa-ku (JP); Hiroshi Uchikawa, Yokohama (JP); Yasuhiko Hirano, Yokohama (JP); Hitoshi Imai, Machida (JP); Hiroyasu Morita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/836,395

(22) Filed: Jul. 14, 2010

(65) Prior Publication Data
US 2010/0277755 A1 Nov. 4, 2010

Related U.S. Application Data

(62) Division of application No. 11/041,067, filed on Jan. 21, 2005, now Pat. No. 7,782,477.

(30) Foreign Application Priority Data

Jan. 30, 2004 (JP) ................................. 2004-023970

(51) Int. Cl.
*G06F 15/00* (2006.01)
*G06F 3/12* (2006.01)
(52) U.S. Cl. ...................................... 358/1.16; 358/1.13
(58) Field of Classification Search .................. 358/1.1, 358/1.9, 1.13, 1.14, 474, 468; 709/201, 223, 709/230; 705/51; 713/171, 176
See application file for complete search history.

(56) References Cited

U.S. PATENT DOCUMENTS

| | | | | |
|---|---|---|---|---|
| 6,385,728 | B1 * | 5/2002 | DeBry | 726/9 |
| 6,438,574 | B1 * | 8/2002 | Nagashima | 718/102 |
| 7,281,133 | B2 * | 10/2007 | Ginter et al. | 713/176 |
| 2002/0034305 | A1 * | 3/2002 | Noyama et al. | 380/282 |
| 2002/0111914 | A1 * | 8/2002 | Terada et al. | 705/60 |
| 2003/0105963 | A1 * | 6/2003 | Slick et al. | 713/171 |
| 2004/0109568 | A1 * | 6/2004 | Slick et al. | 380/277 |
| 2005/0259290 | A1 * | 11/2005 | Tijerino et al. | 358/1.14 |
| 2006/0077420 | A1 * | 4/2006 | Okamoto et al. | 358/1.14 |
| 2006/0165456 | A1 * | 7/2006 | Matsunaga et al. | 400/62 |

* cited by examiner

*Primary Examiner* — Gabriel Garcia
(74) *Attorney, Agent, or Firm* — Canon USA Inc. IP Division

(57) ABSTRACT

An information processing apparatus connected to a printing apparatus via a network encrypts print data if identification information is input, and does not encrypt print data if identification information is not input. If identification information is input and the print data has been encrypted, the information processing apparatus sends a print job including the encrypted print data to the printing apparatus via the network; otherwise, the information processing apparatus sends unencrypted print data to the printing apparatus via the network.

6 Claims, 8 Drawing Sheets

FIG. 7

| JOB ID | JOB TITLE | OWNER NAME | ENCRYPTION | SERIAL NO. |
|---|---|---|---|---|
| 5001 | Abc.txt | Taro | UNENCRYPTED | 10012002300340 04 |
| 5002 | Def.doc | Hanako | ENCRYPTED | 50056006700780 08 |
| 5003 | Ghi.xls | Taro | ENCRYPTED | 10012002300340 04 |
| 5004 | Jkl.pdf | Taro | ENCRYPTED | 10012002300340 04 |
| 5005 | Mno.ppt | Hanako | ENCRYPTED | 50056006700780 08 |

INFORMATION PROCESSING APPARATUS CONNECTED TO A PRINTING APPARATUS VIA A NETWORK AND COMPUTER-READABLE STORAGE MEDIUM HAVING STORED THEREON A PROGRAM FOR CAUSING A COMPUTER TO EXECUTE GENERATING PRINT DATA IN THE INFORMATION PROCESSING APPARATUS CONNECTED TO THE PRINTING APPARATUS VIA THE NETWORK

CROSS REFERENCE TO RELATED APPLICATIONS

The present application is a divisional of U.S. patent application Ser. No. 11/041,067, filed Jan. 21, 2005, now U.S. Pat. No. 7,782,477, entitled "INFORMATION PROCESSING APPARATUS CONNECTED TO A PRINTING APPARATUS VIA A NETWORK AND COMPUTER-READABLE STORAGE MEDIUM HAVING STORED THEREON A PROGRAM FOR CAUSING A COMPUTER TO EXECUTE GENERATING PRINT DATA IN THE INFORMATION PROCESSING APPARATUS CONNECTED TO THE PRINTING APPARATUS VIA THE NETWORK", the content of which is expressly incorporated by reference herein in its entirety. Further, the present application claims priority from Japanese Patent Application No. 2004-023970, filed Jan. 30, 2004, which is also hereby incorporated by reference herein in its entirety.

BACKGROUND OF THE INVENTION

1. Field of the Invention

The present invention relates to an information processing apparatus and method and to a printing apparatus and method. More specifically, the present invention relates to a printing system including a host computer and a printing apparatus for providing high security for printed documents.

2. Description of the Related Art

Recently, the popularity of printing systems for sharing a printing apparatus connected via a network has increased. In an environment where a plurality of users use a printing apparatus, a user who desires a printout is often remote from the printing apparatus when printing. Moreover, the output print data can be accessed by a third party, and high security is not achievable.

A printing apparatus that provides high security is disclosed in, for example, Japanese Patent Laid-Open No. 11-212744. This printing apparatus stores, for example, a print job with a personal identification number (PIN) or password in a storage medium in the printing apparatus, such as a memory or a hard disk, and prints the print job once a user enters the PIN or password on a main panel of the printing apparatus. The printer does not begin printing until a user who desires a printout is physically at the printing apparatus, and high security is therefore achievable because the output print data is not accessible by any third party.

The so-called secured print allows a print job received by a printing apparatus to be kept, and does not actually print it until a user enters a password on an operation panel of the printing apparatus.

It is also necessary for the user to specify a print job at the printing apparatus to start printing. Generally, a desired print job is selected from a list of print jobs displayed on the screen of the printing apparatus, and a password is entered to start printing. Alternatively, an ID card may be used in view of high usability (see, for example, Japanese Patent Laid-Open No. 11-150559). Specifically, ID information registered in the ID card may be used as a PIN or password. When the ID card is inserted into a printing apparatus, the ID information is read, and a print job associated with the read ID information is searched for, and the print job is printed.

If print job data transmitted on a network is monitored and copied, and the copied print job data is sent to another printing apparatus, a printout of the print job data may be caught by a third party. If data stored in a printing apparatus is copied and the copied data is sent to another printing apparatus, a print out of the print job data may also be caught by a third party. In order to avoid these situations, a system for encrypting print job data transmitted on a network or job data stored in a printing apparatus is disclosed in, for example, Japanese Patent Laid-Open No. 09-134264.

With the recent wide prevalence of IC cards, an IC card may be used instead of the ID card described above to easily enter a PIN or password. Due to their high performance, IC cards can be used to encrypt job data, and a higher-security system that makes it impossible to perform decrypting without an IC card used for encryption is conceivable.

In printing an encrypted secured print job using an IC card, generally, each print client computer must have an IC card reader/writer device. However, an IC card reader/writer device provided for each print client computer for only the purpose of encryption becomes costly.

Printing with encryption generally requires a long time. Thus, in secured printing, if the user can select only printing with encryption, usability is poor for print jobs that do not need to be encrypted.

SUMMARY OF THE INVENTION

The present invention selectively prints an encrypted secured print job or an unencrypted secured print job on a print job basis.

The present invention may print an encrypted secured print job using an information storage medium by installing a reader/writer device in a printing apparatus rather than in each information processing apparatus.

In one aspect of the present invention, an information processing apparatus connected to a printing apparatus via a network includes a print data generating unit that generates unencrypted print data, an input unit that inputs identification information, a print data encrypting unit that generates encrypted data by encrypting the unencrypted print data, a control unit that controls the print data encrypting unit to generate the encrypted print data when the identification information is input by the input unit and that controls the print data encrypting unit not to generate the encrypted print data when the identification information is not input by the input unit, and a sending unit that sends a print job to the printing apparatus via the network, the print job including the encrypted print data when the identification information is input by the input unit and the print job including the unencrypted print data when the identification information is not input by the input unit.

In another aspect of the present invention, a printing apparatus connected to an information processing apparatus via a network includes a print job storage unit that stores print jobs that are received from the information processing apparatus, an input unit that inputs first identification information, a job specifying unit that specifies a print job corresponding to the first identification information from the print jobs stored in the print job storage unit based on the first identification information input by the input unit, an encryption determining unit that determines whether or not print data included in the print job specified by the job specifying unit is encrypted print data, a print data decrypting unit that decrypts the encrypted print data if the encryption determining unit determines that the print data included in the print job specified by the job specifying unit is encrypted print data, and an output unit that prints the print data when the encryption determining unit determines that the print data included in the print job specified by the job specifying unit is not encrypted print data and that prints the decrypted print data generated by the print data decrypting unit when the encryption determining unit determines that the print data included in the print job specified by the job specifying unit is encrypted print data.

In another aspect of the present invention, an information processing method for an information processing apparatus connected to a printing apparatus via a network includes steps of generating unencrypted print data, receiving identification information if the identification information is input, performing control so as to encrypt the unencrypted print data when the identification information is input and performing control so as not to encrypt the unencrypted print data when the identification information is not input, and sending a print job to the printing apparatus via the network, the print job including the encrypted print data when the identification information is input and including the unencrypted print data when the identification information is not input.

In yet another aspect of the present invention, a program causes a computer to execute an information processing method for an information processing apparatus connected to a printing apparatus via a network according to the method described above.

In another aspect of the present invention, a printing method for a printing apparatus connected to an information processing apparatus via a network includes steps of storing print jobs that are received from the information processing apparatus via the network, inputting first identification information, specifying a print job corresponding to the first identification information from the stored print jobs based on the first identification information, determining whether or not print data included in the specified print job is encrypted data, and printing the print data when it is determined that the print data included in the specified print job is not encrypted data, and decrypting and printing the print data when it is determined that the print data included in the specified print job is encrypted data.

In still another aspect of the present invention, a computer program that causes a computer to execute a print data outputting method for a printing apparatus connected to an information processing apparatus via a network includes steps as described above.

Further features and advantages of the present invention will become apparent from the following description of exemplary embodiments with reference to the attached drawings.

BRIEF DESCRIPTION OF THE DRAWINGS

FIG. 7 is a table showing a job list stored in the printing apparatus according to an embodiment of the present invention.

DESCRIPTION OF THE EMBODIMENTS

Exemplary embodiments of the present invention are described below in detail with reference to the attached drawings.

First Embodiment

A first embodiment of the present invention is described first.

Figure 1:
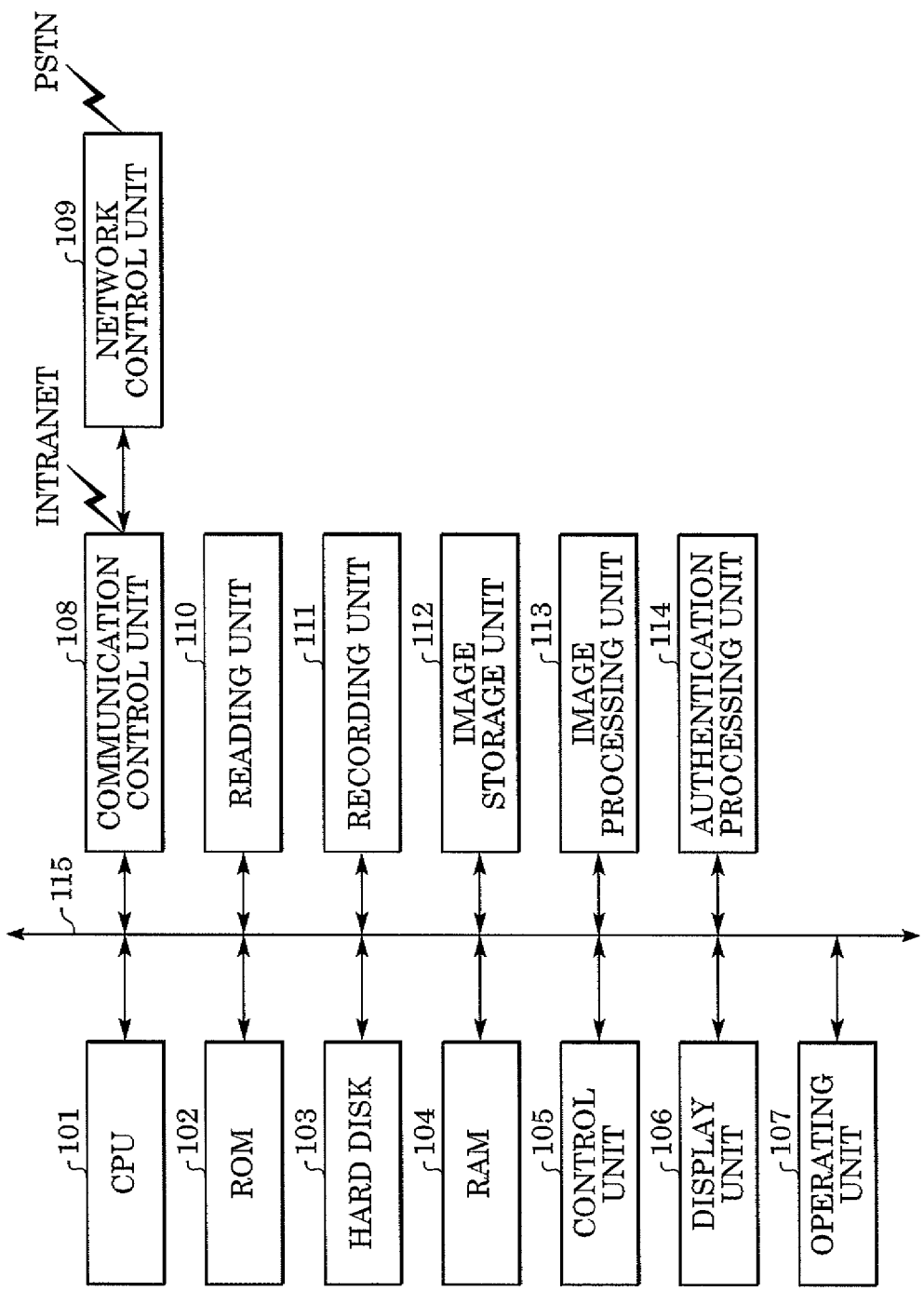
FIG. 1 is a block diagram of a multi function peripheral (MFP) device serving as an image forming apparatus according to an embodiment of the present invention.

FIG. 1 is a schematic block diagram of a multi function peripheral (MFP) device serving as a printing apparatus according to a first embodiment of the present invention.

In FIG. 1, a central processing unit (CPU) 101 reads a control program from a read-only memory (ROM) 102 or a hard disk 103. According to the control program, a control unit 105 performs various functions and various types of processing of the present embodiment, described below, using a random access memory (RAM) 104. The RAM 104 stores various data necessary for operation, for example, driving conditions and management data of the components of the device.

A display unit 106 displays various types of information, such as driving conditions, the state of the device, and input information. An operating unit 107 for inputting settings and instructions from a user may be, for example, a touch panel partially positioned in the display unit 106, a key pad including a ten-key, a start key, etc., or the like, including a combination of the above.

A communication control unit 108 is connected to an intranet or the Internet to communicate document data including image data and control commands.

A network control unit 109 is connected to a public switched telephone network (PSTN), and performs a predetermined line control on an incoming or outgoing call to connect or disconnect a line. Image data and control signals are modulated by an internal modem device and are then transmitted through the network control unit 109 via facsimile, or image data and control signals received through the network control unit 109 via facsimile are demodulated by the modem device.

A reading unit 110 photoelectrically converts light applied to and reflected from an original document to be sent, copied, or stored, which corresponds to the image, and reads image data.

A recording unit 111 forms the read or received image data, or the received print data on a sheet of paper as a permanent visible image, and the sheet of paper is output.

An image storage unit 112 temporarily stores the read or received image data, or the received print data. The image storage unit 112 may be included in the hard disk 103.

An image processing unit 113 performs image processing in response to a request. For example, the image processing unit 113 compresses and encodes the image data to be sent, and expands and decodes the received image data. The image processing unit 113 further converts the received print data into image data, and converts the image data to be stored into an appropriate format or a format specified by the user, e.g., PDF (Portable Document Format). The image processing unit 113 further performs image correction according to the optical response characteristic of the reading unit 110, variations of senders, etc., and modifies the image, e.g., changes the scale of the image, according to the user operation input from the operating unit 107. The image processing unit 113 further optimizes the image data according to the writing characteristics of the recording unit 111.

An authentication processing unit 114 authenticates users and print jobs.

A bus 115 connects the CPU 101, the ROM 102, the hard disk 103, the RAM 104, the control unit 105, the display unit 106, the operating unit 107, the communication control unit 108, the reading unit 110, the recording unit 111, the image storage unit 112, the image processing unit 113, and the authentication processing unit 114.

The MFP device of the present embodiment has a facsimile communication function for transmitting read image data, a transfer function for transferring data to a document management server computer, a copying function for recording and outputting read image data, a receiving and printing function for receiving image data via facsimile, and a printing function for receiving and printing print data from a client computer. The MFP device may serve as not only a copying machine but also a facsimile machine, a printer, and a scanner.

The authentication processing unit 114 includes a reader/writer for magnetic cards or IC cards, and has a user authentication function. When a magnetic card or an IC card having, for example, a department number and a password is inserted, the authentication processing unit 114 reads a preset department number and password from the ROM 102 or the hard disk 103 to perform authentication before performing various functions. A department number and password may be entered by the operating unit 107 without using a magnetic card or an IC card, and the authentication processing unit 114 may perform authentication based on the entered department number and password.

The recording unit 111 may be of the electrophotographic recording type or of any other recording type, such as an ink-jet type, a thermal-head type, or a dot-impact type.

Figure 2:
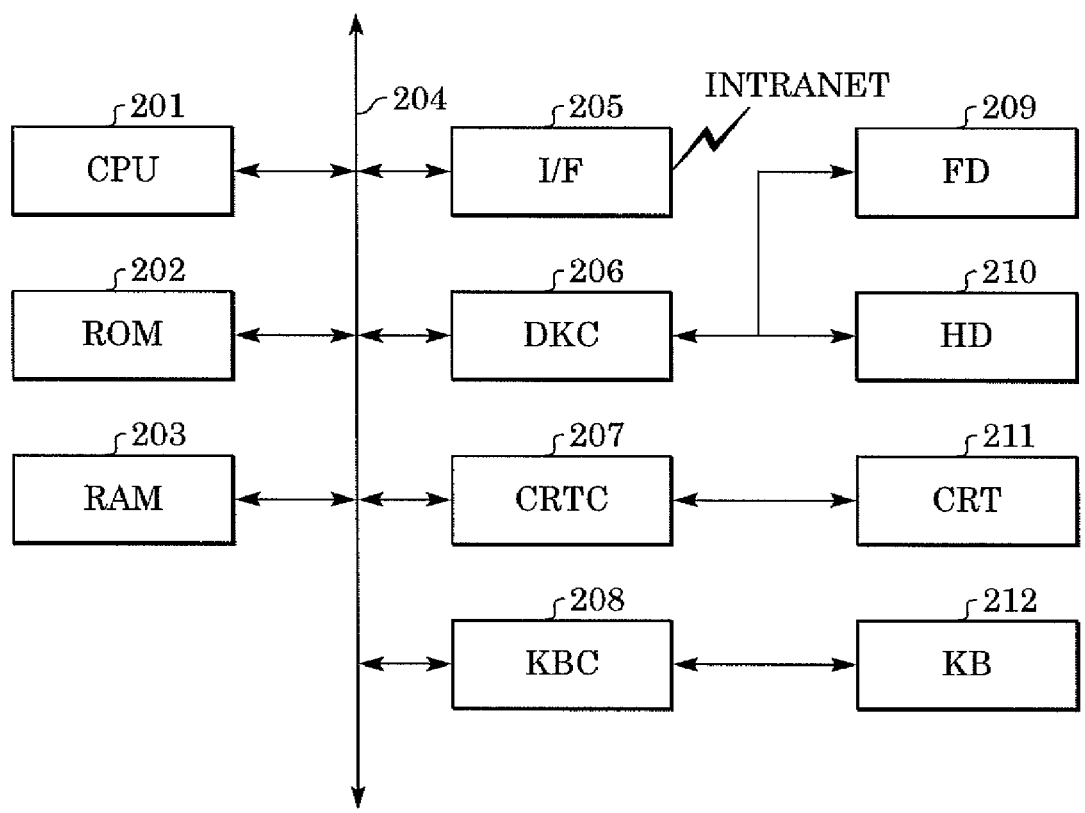
FIG. 2 is a schematic block diagram of an information processing apparatus according to an embodiment of the present invention.

FIG. 2 is a schematic block diagram of a print client computer serving as an information processing apparatus according to the first embodiment of the present invention.

In FIG. 2, the print client computer includes a CPU 201 that executes a program of the present embodiment stored in a ROM 202 or a hard disk (HD) 210 or supplied from a flexible disk drive (FD) 209 for collectively controlling the devices connected to a system bus 204.

A RAM 203 functions as a main memory or work area of the CPU 201. A keyboard (user command input) controller (KBC) 208 controls instructions input from a keyboard (KB) 212 or a pointing device (not shown). A CRT (cathode-ray tube) controller (CRTC) 207 controls a CRT display (CRT) 211. A disk controller (DKC) 206 controls access to the hard disk (HD) 210 that stores a boot program, various applications, an editing file, a user file, an installation program creating program, etc., and the flexible disk (FD) 209. A host interface (I/F) 205 bi-directionally exchanges data with a local printer, a network printer, another network device, or another personal computer (PC).

Figure 3:
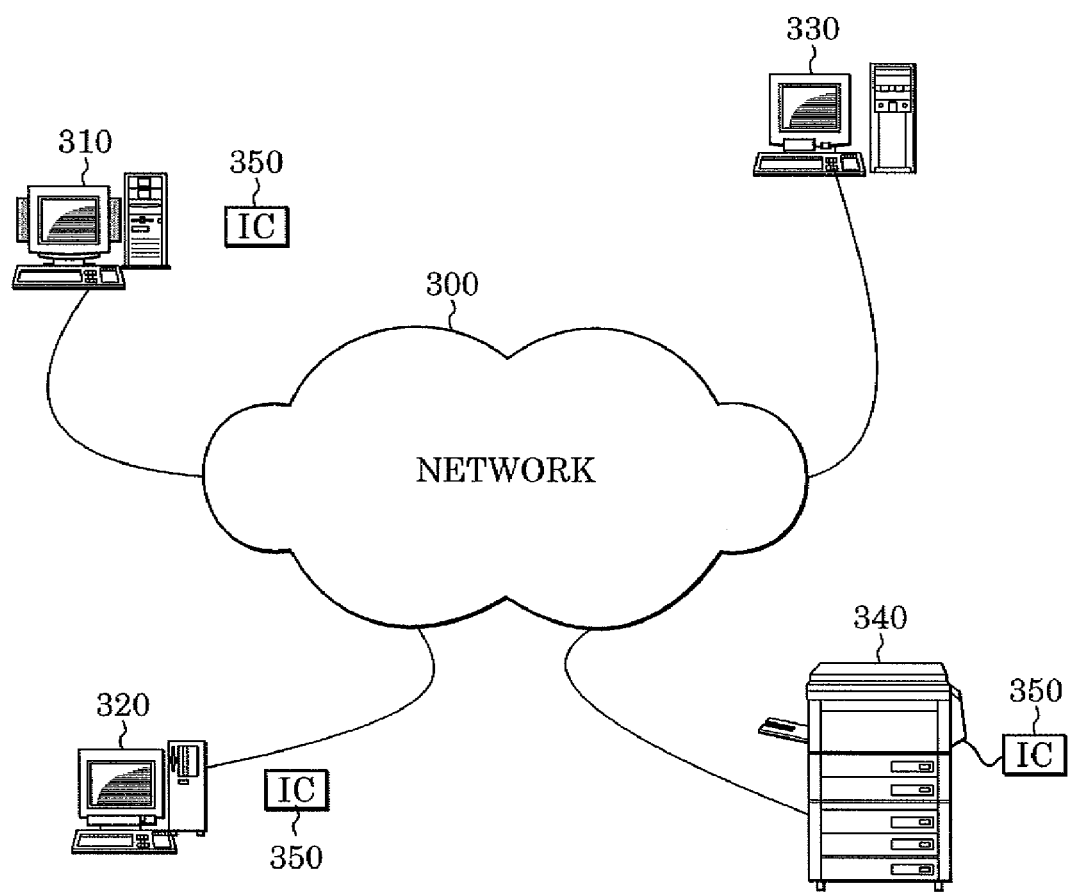
FIG. 3 is a diagram of a network according to an embodiment of the present invention.

FIG. 3 is a diagram of a network 300 according to the first embodiment of the present invention.

In FIG. 3, the network 300 supports, for example, TCP/IP (Transmission Control Protocol/Internet Protocol). Client computers 310 and 320 are computers used by general users that are connected to the network 300.

A management server computer 330 and an MFP device 340 are also connected to the network 300. The management server computer 330 performs, for example, user authentication, if necessary. For example, an electronic document created by the client computer 310 using an application is encrypted using a number printed on a surface of an IC card 350 and a password, and is then sent to the MFP device 340.

Upon receiving the encrypted print job, the MFP device 340 does not print the print job, and temporarily stores it. When a user who desires a printout goes to the MFP device 340, inserts the IC card 350, and enters a password, the encrypted print job stored therein is decrypted and is printed.

The concept of the general structure is merely shown, and a plurality of computers used by general users and a plurality of MFP devices may be used. In place of the MFP device 340, single-function devices, e.g., a scanner, a printer, a facsimile machine, etc., may be connected to the network 300.

Figure 4:
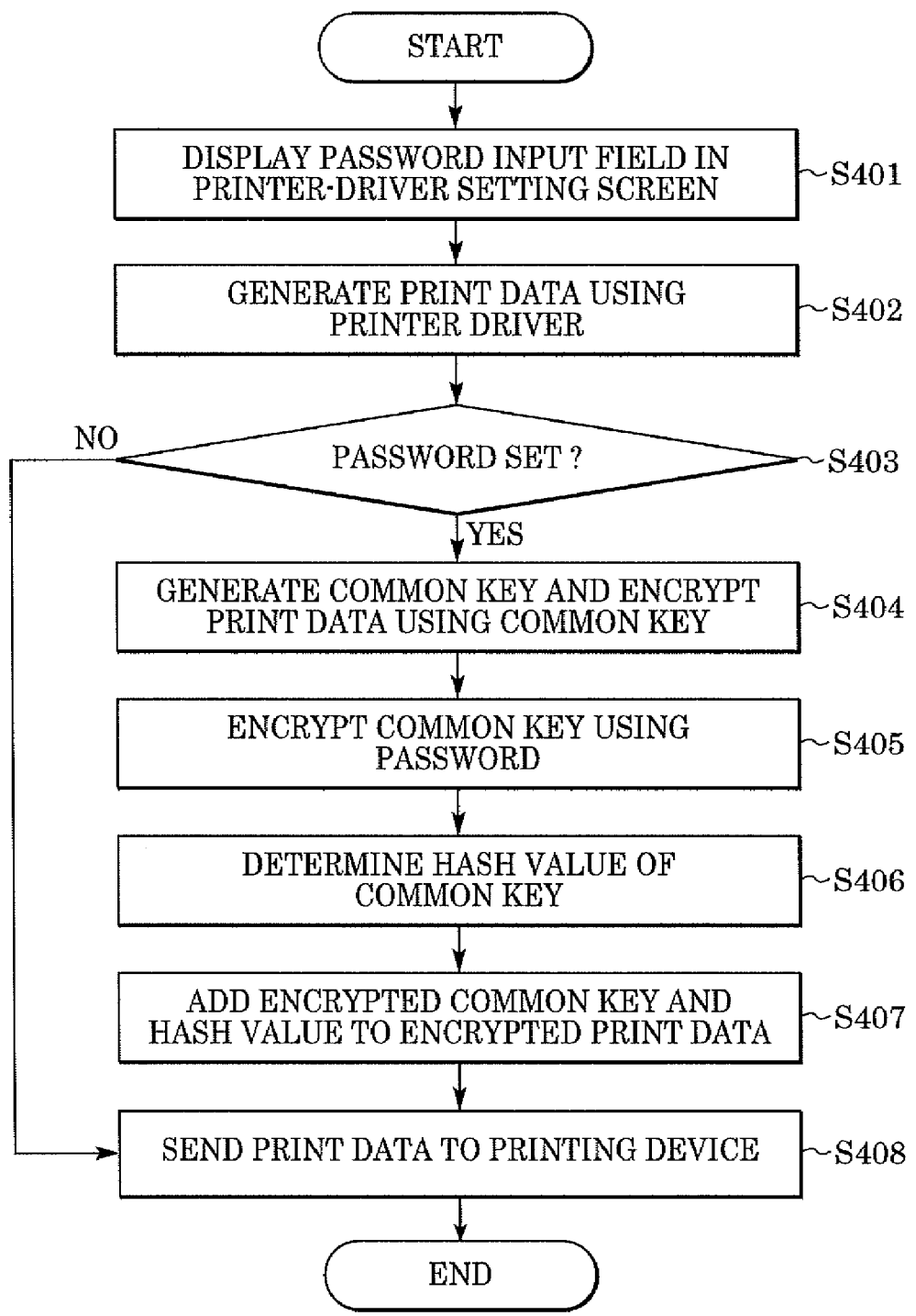
FIG. 4 is a flowchart showing a process performed by a print client computer according to an embodiment of the present invention.

FIG. 4 is a flowchart showing a process performed by the print client computer 310 or 320 according to the first embodiment of the present invention. In this process, encrypted print data and decrypting information added to the print data are sent to the MFP device 340, or unencrypted print data is sent to the MFP device 340.

As shown in FIG. 4, when the process starts, first, in step S401, a printer-driver print setting screen including a password input field is displayed on the print client computer 310 or 320. The user enters a password in this field when the user desires to encrypt print data, and does not enter a password when the user does not encrypt print data.

In step S402, a printer driver generates print data.

In step S403, it is determined whether or not a password has been set. A password may be set by delivering it in the printer driver or adding it to print data, or by any other method.

If it is determined in step S403 that no password has been set, the process proceeds to step S408, in which the print data is sent to the MFP device 340 without being encrypted.

If a password has been set, in step S404, the generated print data is encrypted. In the present embodiment, the print data is encrypted using, but not limited to, a common key encryption method in which, for example, random numbers are generated and used as a common key. Any other common key encryption method may be used.

In step S405, the common key is encrypted. If a common key necessary for decrypting print data is added in plaintext form to the print job, it is meaningless to encrypt the print data. The common key is encrypted using the password entered in step S401. The common key may be encrypted using any encryption method, such as triple DES (Data Encryption Standard) or AES (Advanced Encryption Standard), as far as it can be encrypted and decrypted using a password. The common key may be encrypted using not a password itself but a password that is converted using a certain method.

In step S406, a hash value of the common key is determined for checking correct decrypting in a printing operation. In step S407, the encrypted common key and the hash value of the common key are added to the encrypted print data, and in step S408, the resulting print data is sent to the MFP device 340.

Figure 5:
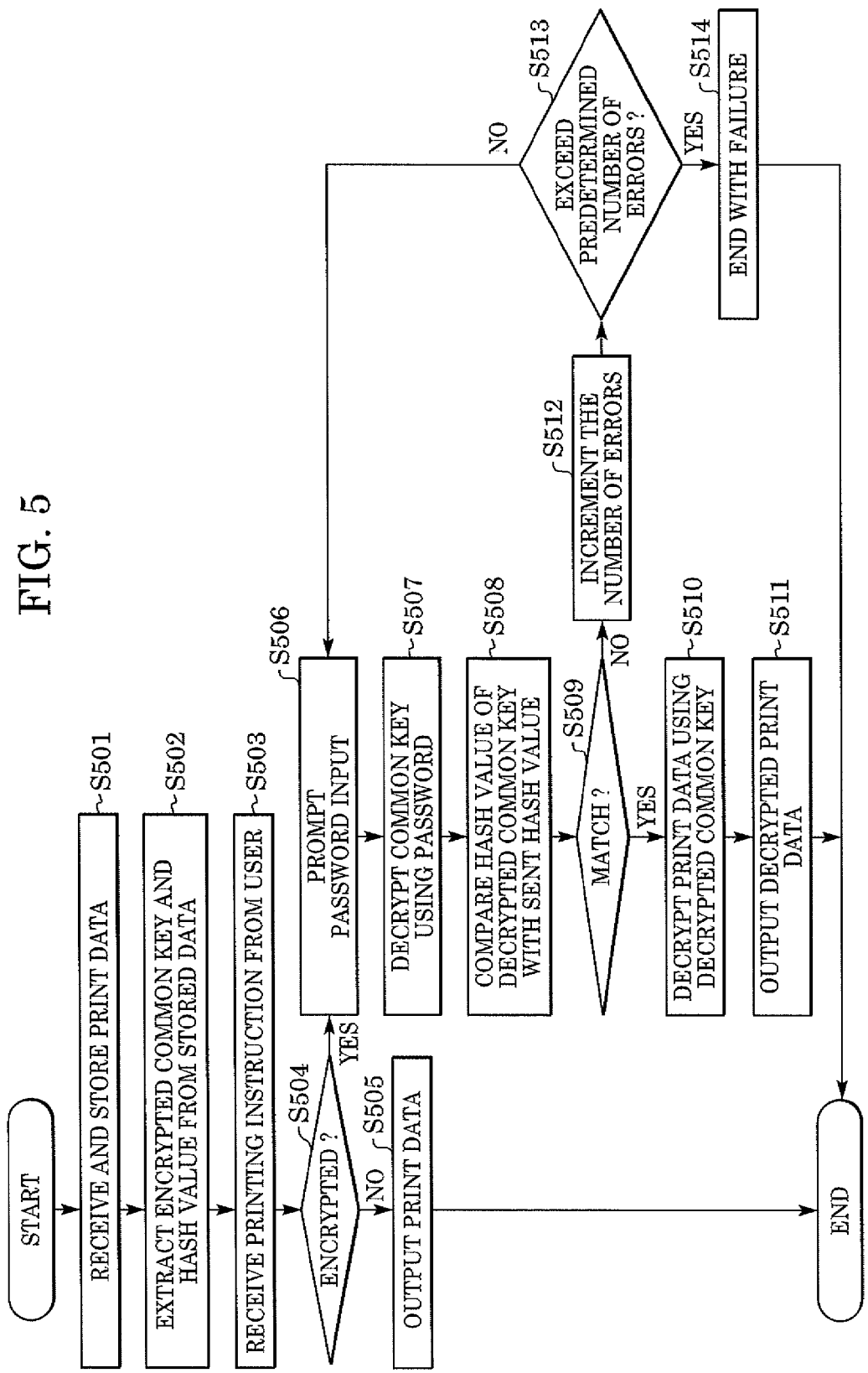
FIG. 5 is a flowchart showing a process performed by a printing apparatus according to an embodiment of the present invention.

FIG. 5 is a flowchart showing a process performed by the MFP device 340 according to the first embodiment of the present invention. In the process, it is determined whether or not print data can be decrypted based on decryption information added to the print data, and, then, the print data is decrypted and output from the MFP device 340.

When the process starts, first, in step S501, encrypted print data sent from the print client computer 301 or 302 is received and stored in the image storage unit 112 of the MFP device 340.

In step S502, decrypting information, i.e., the encrypted common key and the hash value of the common key, is extracted from the print data stored in the image storage unit 112.

In step S503, a printing instruction is given.

Figure 8:
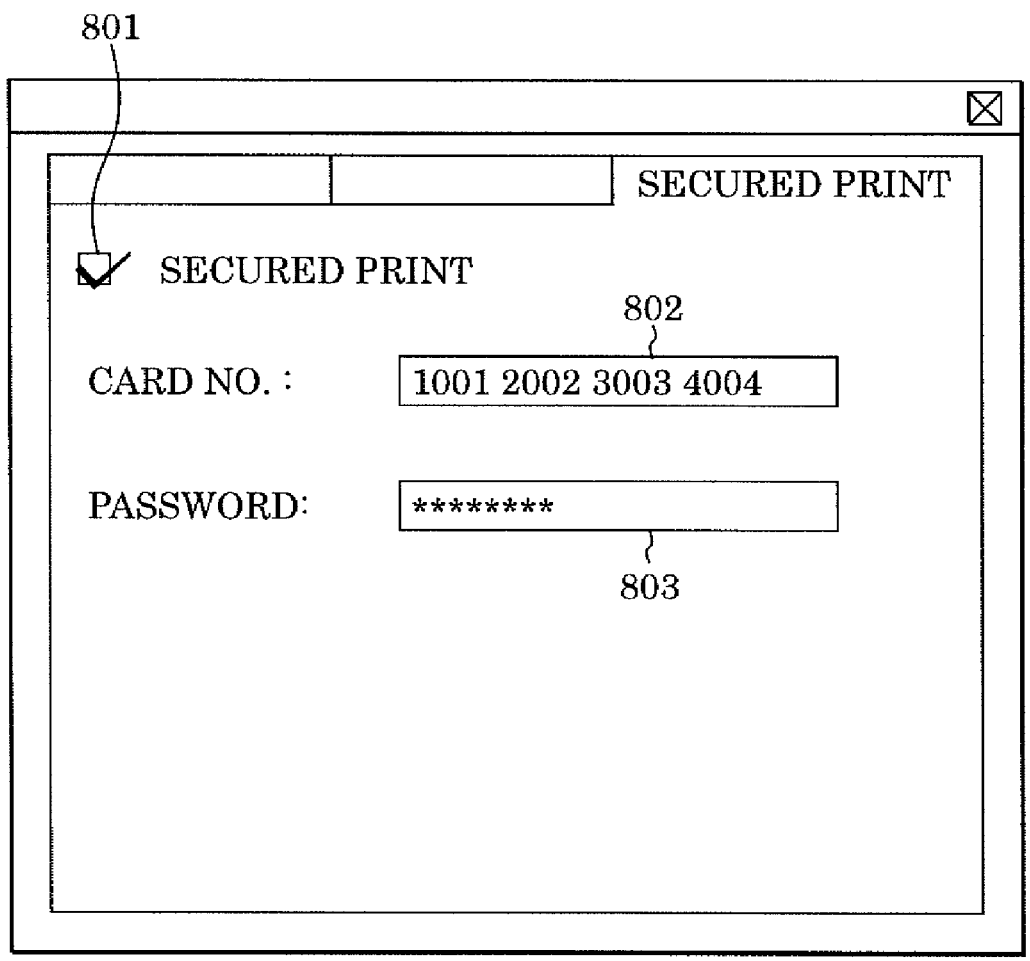
FIG. 8 is an illustration of a user interface of a printer driver according to an embodiment of the present invention.

In step S504, it is determined whether or not the print data is encrypted data by, for example, determining whether or not encrypted information including the encrypted common key and the hash value added in step S407 shown in FIG. 4 exists. If it is determined in step S504 that the print data is unencrypted data, then in step S505, the print data is directly printed. If it is determined that the print job is unencrypted data and if a "secured print" instruction, described below with reference to FIG. 8, is given, then in step S505, the print job is not printed but is stored in the image storage unit 112.

If it is determined in step S504 that the print data is encrypted data, then in step S506, the user is prompted to enter a given password when printing begins. For example, the IC card 350 is inserted into the MFP device 340, thus instructing beginning of printing. When the user inserts the IC card 350, the encrypted common key is decrypted using the entered password.

In step S507, the encrypted common key is decrypted using the acquired password. Then, in step S508, the hash value of the decrypted common key is determined, and is checked against the hash value obtained from the print data.

In step S509, it is determined whether or not the hash value obtained from the print data is identical to the hash value of the decrypted common key. If it is determined that these hash values are identical, it is determined that the common key has correctly been decrypted. Then, in step S510, the print data is decrypted using the decrypted common key, and in step S511, the decrypted print data is printed.

If it is determined in step S509 that the two hash values are not identical, it is determined that the common key has not correctly been decrypted, that is, that the entered password is incorrect. Then, in step S512, the number of errors is incremented.

In step S513, it is determined whether or not the number of errors exceeds a predetermined value. If it is determined that the number of errors does not exceed the predetermined value, the process returns to step S506, and the user is prompted to re-enter a password. If it is determined in step S513 that the number of errors exceeds the predetermined value, the process proceeds to step S514, and the process ends with failure.

One main reason for incorrectly decrypting the common key is that the password entered for encryption and the password entered for decrypting differ from each other. The processing of steps S512 and S513 is provided for a one-to-one search for a password. If the print data is not so confidential, the processing of steps S512 and S513 may be omitted, and the process may always return from step S509 to step S506.

Figure 6:
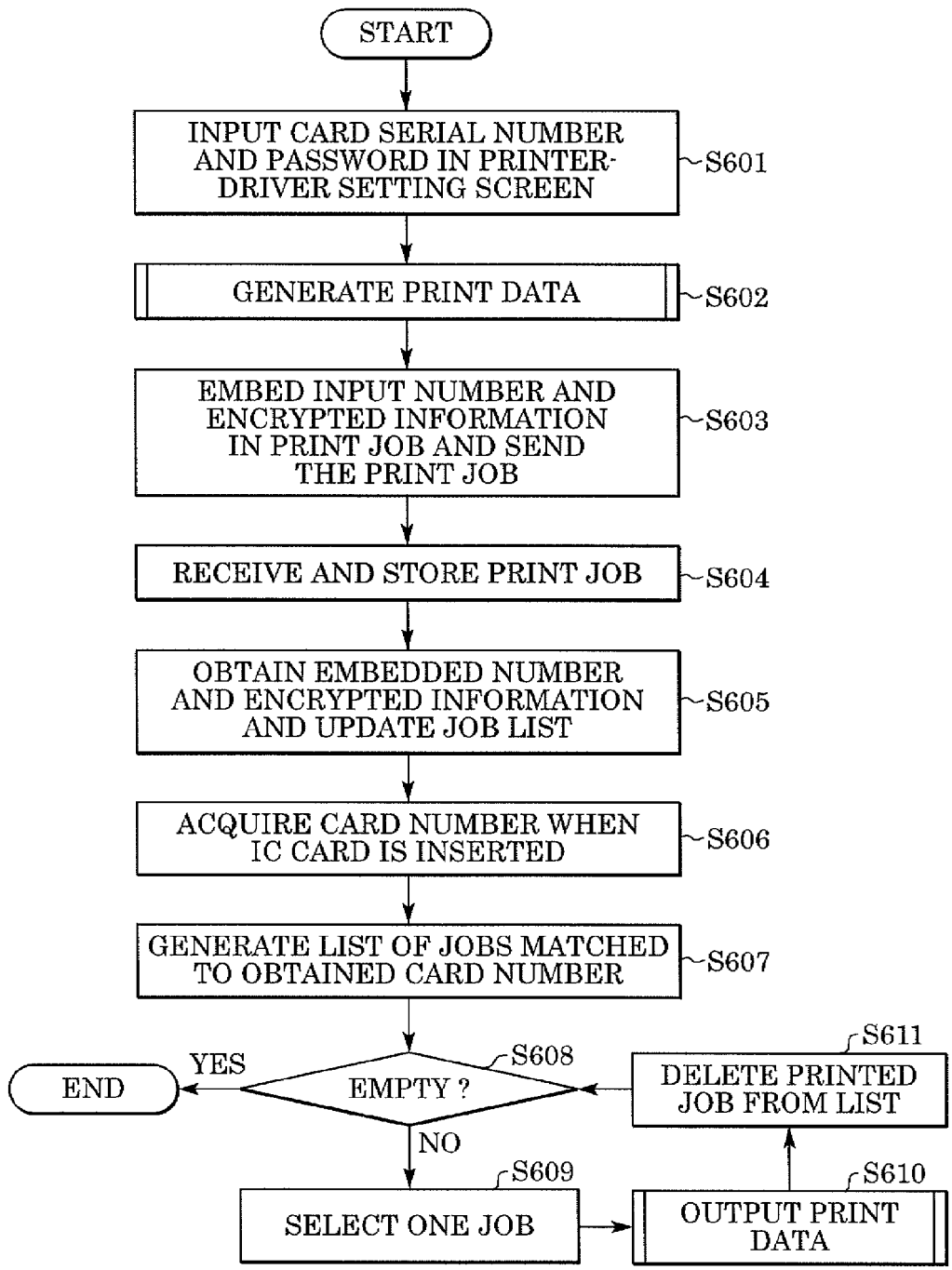
FIG. 6 is a flowchart showing a printing procedure according to an embodiment of the present invention.

FIG. 6 is a flowchart showing a process for printing an encrypted secured print job using the IC card 350 without a reader/writer for the IC card 350 being provided for the print client computer 310 (320) according to the first embodiment of the present invention.

The processing of steps S601 to S603 is performed by the client computer 310 or 320, and the processing of steps S604 to S611 is performed by the MFP device 340.

Before or after printing begins, in step S601, a serial number printed on a surface of the IC card 350 for printing an encrypted secured print job is entered in a printer-driver setting screen. If a password is also entered, an instruction to generate an encrypted secured print job is given; if a password is not entered, secured print without encryption or immediate printing without using secured print is instructed.

In step S602, print data is generated in the manner described in the processing of steps S402 to S407 shown in FIG. 4.

In step S603, the serial number entered in step S601 is embedded in the print data generated in step S602, and the resulting print data is sent to the MFP device 340.

In step S604, the print data sent in step S603 is received, and is stored in the image storage unit 112 of the MFP device 340.

In step S605, the embedded serial number and encrypted information are obtained from the print data stored in step S604, and a job list is updated. In the present embodiment, the job list is a database including a list of all secured print jobs stored in the MFP device 340. The other information embedded in the print data, e.g., print job titles, print job owner names, and printing time and date, may also be obtained, if necessary, and may be stored as members of the job list.

In step S606, when the user inserts the IC card 350 into the MFP device 340, the serial number of the inserted IC card 350 is acquired.

In step S607, the job list is searched for print data associated with the acquired serial number, and a list of candidate print jobs is generated.

In step S608, it is determined whether or not the candidate print job list generated in step S607 is empty. If it is determined that the candidate print job list is empty, the process ends. If the list includes one or more candidate print jobs, then in step S609, a job is selected and subjected to the print data output processing in step S610 as described in the flowchart shown in FIG. 5. After performing the output processing, the job is deleted from the candidate print job list. Then, the process returns to step S608.

FIG. 7 is a table showing a job list to be updated in step S605 shown in FIG. 6.

In this table, five secured print jobs are stored in the MFP device 340; three print jobs are allocated to "Taro", and two print jobs are allocated to "Hanako". One of the print jobs allocated to "Taro" is an unencrypted secured print job, and the remaining two print jobs are encrypted secured print jobs. The two print jobs allocated to "Hanako" are encrypted secured print jobs.

For example, when Taro goes to the MFP device 340 and inserts his IC card 350 with IC card serial No. 1001200230034004 into the MFP device 340, the print jobs with job IDs 5001, 5003, and 5004 are to be printed. The print job with job ID 5001 is an unencrypted secured print job, and therefore does not require a password to be entered, whereas, the print jobs with job IDs 5003 and 5004 are encrypted print jobs, and therefore require a password to be entered. Taro does not need to be at the MFP device 340. He may let another trustable person take a printout by lending his IC card 350 to the person and letting the person know the password.

FIG. 8 illustrates a user interface of the printer driver that enables secured printing.

In FIG. 8, a check box 801 is clicked to allow an encrypted or unencrypted secured print job. In this case, the print job is stored in the image storage unit 112 until an instruction from the user is given, and the received print data is not immediately printed by the MFP device 340. When the check box 801 is not clicked, standard printing is performed, that is, the received print job is immediately printed by the MFP device 340.

An editing box 802 is used to enter the IC card number printed on a surface of the IC card 350.

An editing box 803 is used to enter a password for encrypting the given print job. In the present embodiment, leaving the editing box 803 blank allows secured print without encryption. When a password is entered, secured print with encryption is carried out.

Accordingly, a serial number printed on a surface of the IC card 350 is entered before printing begins, and the MFP device 340 reads a serial number from the IC card 350. The use of the serial numbers realizes a secured print system using the IC card 350 without a reader/writer for the IC card 350 being provided for each print client computer.

Moreover, the user is able to intuitively select high-speed high-usability secured print without encryption or high-security secured print with encryption depending upon the print job by determining whether or not a password is entered before printing begins. In particular, when a contactless IC card 350 is used for specifying an individual, printing begins merely by bringing the IC card 350 in close proximity to the MFP device 340, thus achieving high-usability secured print.

Second Embodiment

In the first embodiment, a password is entered on a print job basis. However, if the same password is given to all print jobs, it may be inconvenient that the same password be entered each time a print job is to be printed.

In a second embodiment of the present invention, an entered password is stored for a certain period of time, and the stored password is used to decrypt a second and the subsequent print jobs. If a print job cannot be decrypted, that is, if the hash values are compared in step S508 shown in FIG. 5 and it is determined in step S509 that the hash values are not identical, the user is prompted to enter a password.

A password may be stored for a period of time during which an IC card is inserted one time or for a predetermined period of time, or by any other method. A limited or unlimited number of passwords may be stored.

Third Embodiment

In the first embodiment, the IC card 350 is used. Alternatively, a portable device having an identifiable number and having a mechanism for acquiring the identifiable number, e.g., a portable phone, may be used instead of the IC card 350.

Other Embodiments

The present invention may encompass a case where software program code for achieving the features of the foregoing embodiments is supplied to a computer (a CPU or an MPU (micro-processing unit)) of an apparatus or system connected to various devices so that the various devices are operated to achieve the foregoing embodiments, and the various devices are operated according to the program stored in the computer of the system or apparatus.

In this case, the software program code itself realizes the features of the foregoing embodiments. The program code is provided on a recording medium which may include, but is not limited to, a flexible disk, a hard disk, an optical disk, a magneto-optical disk, a compact disk read-only memory (CD-ROM), a magnetic tape, a non-volatile memory card, and a ROM.

The computer executes the supplied program code, thus realizing the features of the foregoing embodiments. Where the program code cooperates an operating system (OS) running on the computer or other application software to realize the features of the foregoing embodiments, the program code may constitute an embodiment of the present invention.

The present invention may also encompass a case where the supplied program code is stored in a memory of a function extension board of the computer or a function extension unit connected to the computer, after which a CPU or the like of the function extension board or function extension unit executes a portion of or the entirety of actual processing in accordance with an instruction of the program code, to realize the features of the foregoing embodiments.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printing apparatus connected to an information processing apparatus via a network, the printing apparatus comprising:
   a print job receiving unit that receives a print job sent from the information processing apparatus;
   a storage unit that stores the print job received by the print job receiving unit;
   an input unit that receives an input of identification information;
   a reading unit that is capable of reading medium unique information stored in an information storage medium;
   a print data decrypting unit that decrypts encrypted print data;
   an output unit that performs printing output based on print data; and
   a control unit that, when print data included in the print job received by the print job receiving unit has been encrypted, retains the encrypted print data in the storage unit until the input unit has received an input of identification information, in response to the input unit having received an input of identification information, controls the print data decrypting unit to decrypt the encrypted print data using the identification information and the output unit to print and output the decrypted print data, when print data included in the print job received by the print job receiving unit has medium unique information embedded therein, retains the print data having the medium unique information embedded therein in the storage unit until the reading unit has read medium identification information, in response to matching between the medium unique information read by the reading unit from the information storage medium and the information embedded in the print data, controls the output unit to print and output the print data, and when print data included in the print job received by the job receiving unit is unencrypted and there is no medium unique information embedded in the print data, controls the output unit to print and output the print data without receiving an input of identification information by the input unit and reading medium unique information by the reading unit.

2. The printing apparatus according to claim 1, further comprising:
   a key information decrypting unit that decrypts encrypted key information included in the print job using the identification information received by the input unit;
   a generating unit that generates verification data from the key information decrypted by the key information decrypting unit, and
   a determining unit that determines whether or not the verification data generated by the generating unit and verification data included in the print job are identical, wherein the print data decrypting unit decrypts the encrypted print data in response to the determining unit having determined that the verification data generated by the generating unit and the verification data included in the print job are identical.

3. The printing apparatus according to claim 2, wherein the identification information is a password, and the verification data is a hash value of the key information.

4. A print data generation method performed in an information processing apparatus connected to a printing apparatus via a network, the print data generation method comprising:
- a print data generating step for generating print data;
- an input step capable of receiving an input of identification information and an input of medium unique information that is information unique to an information storage medium readable by the printing apparatus;
- a print data encrypting step for encrypting the print data generated in the print data generating step;
- an embedding step for embedding medium unique information in the print data generated in the print data generating step;
- a control step of, in response to an input of identification information having being received in the input step, controlling so that print data is encrypted in the print data encrypting step using the identification information,
- in response to an input of medium unique information having been received in the input step, controlling the embedding step to embed the medium unique information in the print data, and
- in response to an input of either identification information or medium unique information having not been received in the input step, controlling the print data encrypting step not to encrypt the print data and the embedding step not to embed medium unique information in the print data; and
- a sending step of sending a print job to the printing apparatus via the network, the print job including one of print data encrypted in the print data encrypting step, print data in which medium unique information has been embedded in the embedding step, and print data that is not encrypted in the print data encrypting step and in which no medium unique information is embedded in the embedding step.

5. A printing method performed in a printing apparatus connected to an information processing apparatus via a network, the printing method comprising:
- a print job receiving step of receiving a print job sent from the information processing apparatus;
- a storing step of storing the print job received in the print job receiving step in a storage unit;
- an input step of receiving an input of identification information;
- a reading step capable of reading medium unique information stored in an information storage medium;
- a print data decrypting step of decrypting encrypted print data;
- an output step of performing printing output based on print data; and
- a control step of, when print data included in the print job received in the print job receiving step has been encrypted, retaining the encrypted print data in the storage unit until an input of identification information has been received in the input step, and, in response to an input of identification information having been received in the input step, controlling so that the encrypted print data is decrypted in the print data decrypting step using the identification information and so that the decrypted print data is printed and output in the output step,
- when print data included in the print job received in the print job receiving step has medium unique information embedded therein, retaining the print data having the medium unique information embedded therein in the storage unit until medium identification information has been read in the reading step, and, in response to matching between the medium unique information read in the reading step from the information storage medium and the information embedded in the print data, controlling so that the print data is printed and output in the output step, and
- when print data included in the print job received in the job receiving step is unencrypted and there is no medium unique information embedded in the print data, controlling so that the print data is printed and output in the output step without receiving an input of identification information in the input step and reading medium unique information in the reading step.

6. A non-transitory computer-readable storage medium having stored thereon a computer program for causing a computer to execute performing printing in a printing apparatus connected to an information processing apparatus via a network, the computer program causing the computer to execute:
- a print job receiving step of receiving a print job sent from the information processing apparatus;
- a storing step of storing the print job received in the print job receiving step in a storage unit;
- an input step of receiving an input of identification information;
- a reading step capable of reading medium unique information stored in an information storage medium;
- a print data decrypting step of decrypting encrypted print data;
- an output step of performing printing output based on print data; and
- a control step of, when print data included in the print job received in the print job receiving step has been encrypted, retaining the encrypted print data in the storage unit until an input of identification information has been received in the input step, and, in response to an input of identification information having been received in the input step, controlling so that the encrypted print data is decrypted in the print data decrypting step using the identification information and so that the decrypted print data is printed and output in the output step,
- when print data included in the print job received in the print job receiving step has medium unique information embedded therein, retaining the print data having the medium unique information embedded therein in the storage unit until medium identification information has been read in the reading step, and, in response to matching between the medium unique information read in the reading step from the information storage medium and the information embedded in the print data, controlling so that the print data is printed and output in the output step, and
- when print data included in the print job received in the job receiving step is unencrypted and there is no medium unique information embedded in the print data, controlling so that the print data is printed and output in the output step without receiving an input of identification information in the input step and reading medium unique information in the reading step.

* * * * *